United States Patent
Schenk et al.

(12) 
(10) Patent No.: US 10,219,319 B2
(45) Date of Patent: Feb. 26, 2019

(54) DEVICE AND METHOD FOR CONTROLLING A NODE OF A WIRELESS NETWORK

(75) Inventors: Tim Corneel Wilhelmus Schenk, Eindhoven (NL); Daniel Martin Görgen, Eindhoven (NL); Javier Espina Perez, Eindhoven (NL); Oscar Garcia Morchon, Aachen (DE); Marc Aoun, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 143 days.

(21) Appl. No.: 14/240,150

(22) PCT Filed: Aug. 30, 2012

(86) PCT No.: PCT/IB2012/054456
§ 371 (c)(1),
(2), (4) Date: Feb. 21, 2014

(87) PCT Pub. No.: WO2013/030779
PCT Pub. Date: Mar. 7, 2013

(65) Prior Publication Data
US 2014/0192723 A1    Jul. 10, 2014

Related U.S. Application Data

(60) Provisional application No. 61/530,427, filed on Sep. 2, 2011.

(51) Int. Cl.
*H04W 84/18*     (2009.01)
*H05B 37/02*     (2006.01)

(52) U.S. Cl.
CPC ........ *H04W 84/18* (2013.01); *H05B 37/0272* (2013.01)

(58) Field of Classification Search
CPC .......................... H04W 84/18; H05B 37/0272
See application file for complete search history.

(56) References Cited

U.S. PATENT DOCUMENTS

| | | | |
|---|---|---|---|
| 7,333,785 B1 * | 2/2008 | Lavelle | H04W 52/028 345/163 |
| 7,342,513 B2 | 3/2008 | Meyer | |
| 2005/0202785 A1 * | 9/2005 | Meyer | 455/66.1 |
| 2008/0026781 A1 * | 1/2008 | Ho et al. | 455/507 |
| 2008/0143273 A1 * | 6/2008 | Davidson | H05B 37/0272 315/294 |

(Continued)

FOREIGN PATENT DOCUMENTS

| | | |
|---|---|---|
| CN | 101848142 A | 9/2010 |
| JP | 2005051728 A | 2/2005 |

(Continued)

*Primary Examiner* — Robert M Morlan
*Assistant Examiner* — Pamit Kaur
(74) *Attorney, Agent, or Firm* — Akarsh P. Belagodu (57) ABSTRACT

In order to increase transmission reliability and transmission efficiency in the presence of interference at a transmitting or receiving node of a wireless network a device for controlling the node of the wireless network is provided, wherein the node is associated to at least one load unit. The device comprises a control unit that is adapted to adjust a communication mode of the node based on an operation state of the load unit.

12 Claims, 9 Drawing Sheets

(56) References Cited

U.S. PATENT DOCUMENTS

| | | | |
|---|---|---|---|
| 2009/0066540 A1* | 3/2009 | Marinakis | H05B 37/0272 340/909 |
| 2010/0029268 A1 | 2/2010 | Myer et al. | |
| 2010/0296285 A1* | 11/2010 | Chemel et al. | 362/235 |
| 2011/0026434 A1* | 2/2011 | Van Der Stok | G01S 5/0289 370/254 |
| 2011/0153111 A1* | 6/2011 | Doh | H02J 9/005 700/296 |
| 2011/0299470 A1* | 12/2011 | Muller et al. | 370/328 |

FOREIGN PATENT DOCUMENTS

| | | |
|---|---|---|
| JP | 2006211259 A | 8/2006 |
| JP | 2008236108 A | 10/2008 |
| JP | 2008278431 A | 11/2008 |
| JP | 2010212766 A | 9/2010 |
| WO | 2009104121 A2 | 8/2009 |
| WO | WO 2009104121 A2 * | 8/2009 |
| WO | 2010097738 A1 | 9/2010 |
| WO | 2010141448 A1 | 12/2010 |
| WO | 2010141454 A1 | 12/2010 |
| WO | 2011010270 A1 | 1/2011 |
| WO | 2011014579 A1 | 2/2011 |
| WO | 2011014581 A1 | 2/2011 |
| WO | 2011022506 A1 | 2/2011 |
| WO | 2011055259 A1 | 5/2011 |
| WO | 2012042426 A1 | 4/2012 |
| WO | 2012090116 A1 | 7/2012 |

* cited by examiner

DEVICE AND METHOD FOR CONTROLLING A NODE OF A WIRELESS NETWORK

FIELD OF THE INVENTION

The invention relates to a device, a method and a system for controlling a node of a wireless network, in particular a wireless mesh network.

Recently, wireless mesh networks attract more and more attention, e.g. for remote control of illumination system, building automation, monitoring applications, sensor systems, medical applications and air condition systems. In particular, a remote management of outdoor luminaires, so-called telemanagement becomes increasingly important. On the one hand, this is driven by environmental concerns, since telemanagement systems enable the use of different dimming patters, for instance as function of time, weather conditions and season, allowing a more energy efficient use of the outdoor lighting system or other systems as mentioned above. On the other hand, this is also driven by economical reasons, since the increased energy efficiency also reduces operation costs. Moreover, the system can remotely monitor power usage and detect failures of the controlled elements, e.g. lamp failure or driver failure, which allows for determining the best time for repairing or replacing the element of the system, e.g. the lamps.

Current radio frequency (RF), based wireless solutions use either star network topology or mesh network topology for communication between the elements of the network. In a star network, a data collector has a direct communication path to every node in a network. However, this typically requires a high power/high sensitivity base station like controller, which makes the solution cumbersome to deploy and expensive. In a mesh network, the plurality of nodes in general does not communicate directly with the central controlling device, but via so-called multi-hop communications. In a multi-hop communication, a data packet is transmitted from a sender node to a destination node via one or more intermediate nodes. Nodes act as routers to transmit data packets from neighboring nodes to nodes that are too far away to reach in a single hop, resulting in a network that can span larger distances. By breaking long distances into a series of shorter hops, signal strength is sustained. Consequently, routing is performed by all nodes of a mesh network, deciding to which neighboring nodes the data packet is to be sent. Hence, a mesh network is a very robust and stable network with high connectivity and thus high redundancy and reliability.

Mesh network transmission techniques can be divided into two groups: flooding-based and routing-based mesh networks. In a flooding-based mesh network, data packets are forwarded by all nodes in the network. Therefore, a node does not have to make complicated routing decisions, but just broadcasts the data packet. By these means, the technique is quite robust. However, in large networks, the data overhead due to forwarding impacts the overall data rate. Moreover, collisions of data packets are more likely to occur, further reducing the overall performance. Routing-based mesh networks can be further divided into pro-active and re-active schemes. In a pro-active routing-based network, immediate network paths are stored in routing tables in each node. The routing tables are kept up to date, e.g. by sending regular beacon messages to neighboring nodes to discover efficient routing paths. However, the pro-active update of the routing tables consumes large parts of network resources. In contrast, reactive schemes avoid a permanent overhead and large routing tables by discovering routes on demand. They use flooding to discover a network path and cache active routes or nodes. When routes are only used scarcely for single data packets, flooding the data packets instead of performing a route discovery might be more efficient. If routes are kept long enough to avoid frequent routing, reactive schemes degenerate to pro-active schemes. An example for a re-active routing-based mesh network is used in ZigBee.

Mesh networks, as discussed herein, mostly refer to networks having a plurality of nodes which are stationary, wherein the communication between the nodes is performed wirelessly.

Figure 1:
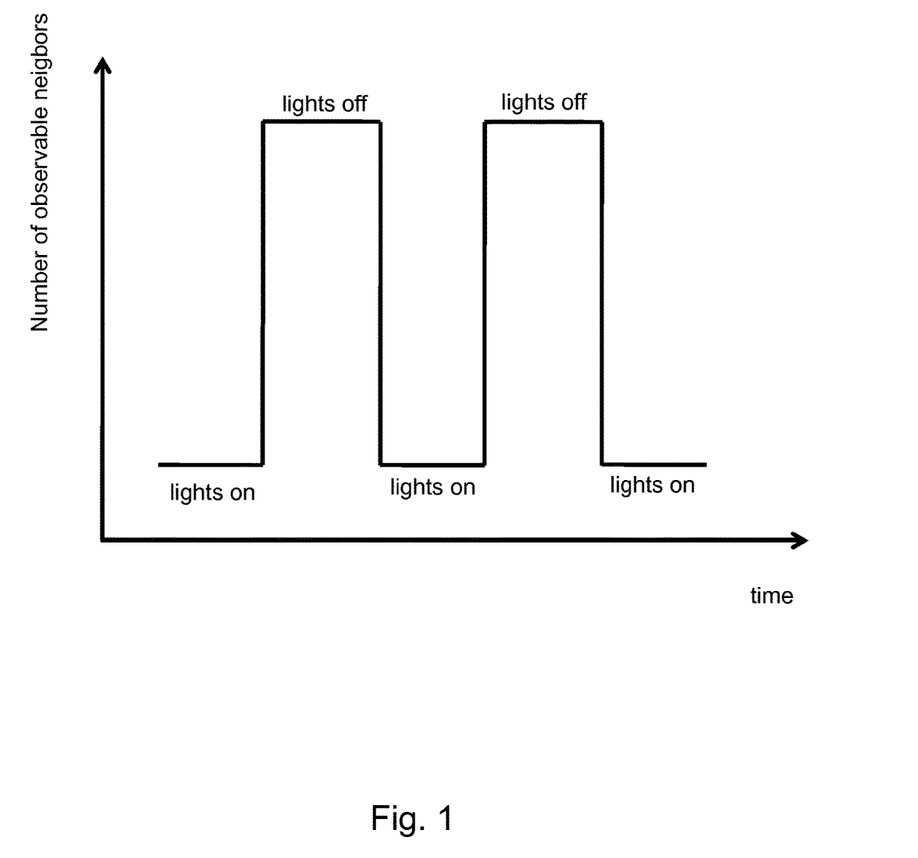
FIG. 1 shows a diagram illustrating an average number of neighbors a node observes in a mesh network as a function of time.

One of the challenges with these wireless solutions is that they can be susceptible to electromagnetic interference. For instance, in case of outdoor luminaires, the wireless controllers in the luminaires can experience interference from the lamp driver located in a same luminaire. This is especially the case for high frequency electronic drivers, which are used for LED and fluorescent light sources. The impact of this is illustrated in FIG. 1, which shows the average number of neighboring nodes observed by a luminaire node in the mesh network, as a function of time under different operation states. As can be recognized from FIG. 1 is that the number of observed neighboring nodes decreases when the lights are on. Such decrease is caused by an increased noise level due to the switched on lamp driver, which generates said noise and negatively influences the transmission performance of the node during transmitting and receiving messages to/from other nodes. This is, since the lamp driver and the lamp use much more power than the communications solutions. Moreover, the lamp driver and the lamp on the one hand and the communication unit of the node on the other hand are located close to each other in the luminaire. They can even be integrated in the same physical device, i.e. a lamp driver with a wireless interface or a wireless LED lamp with integrated driver and communications functionality in the same physical device.

Effectively, this proximity increases the noise level, and thus leads to a reduced communication ability, when the lamp driver is switched on. Such reduced communication ability causes non-stable behavior of the system, which is not desired and may result in a plurality of retransmissions of messages between the nodes wasting network resources.

The described mesh technology relies on the knowledge of neighboring nodes, which can be act as routers of the messages sent to, and from, the central controlling device or a data collector node. Due to (lamp driver) electromagnetic interference (EMI), the communication abilities of the nodes are influenced, that is after switching on/off the lamp or changing the operation state of the lamp, e.g. by dimming, the routing table in the node is no longer up to date, which causes routing/communication errors. Hence, state of the art mesh network communications are not designed to deal with (lamp driver) EMI.

This situation also occurs in other systems, like air-conditioner systems, including a plurality of indoor units and outdoor units connected and controlled wirelessly.

U.S. Pat. No. 7,342,513 B2 describes a wireless communication system for use within an aircraft. The system uses an integrated lens antenna system that takes advantage of the quantity and location of light sources such that any given light source will have a direct radio frequency path to several other light sources. A virtual network is created such that if the path between any two light sources becomes disrupted, alternate paths are constructed under software control.

SUMMARY OF THE INVENTION

In view of the above disadvantages and problems associated with the prior art, it is an object of the present invention to provide a device, a method and a system for controlling a node of a wireless network that provide for an improved transmission efficiency in the presence of interferences.

The object is solved by the features of the independent claims.

The present invention is based on the idea to adapt the communication/transmission behaviour of one ore more nodes of the network according to operating conditions that cause any reduction of communication ability, e.g. interference or increased noise at the location of the respective transmitting/receiving nodes. Accordingly, proper communication/transmission modes or parameters are selected and transmission efficiency and transmission reliability is improved. Interferers may be devices that are controlled by and/or attached to the node, such as load drivers, the load itself, e.g. motors, but may also be external (foreign) devices.

The object is solved by a device for controlling a node of a wireless network, like a star network or a mesh network. The node is associated to at least one load unit. This includes a respective connection for controlling the at least one load unit, including directly coupled or operatively linked. The device comprises a control unit that is adapted to adjust a communication mode of the associated node based on an operation state of the at least one load unit. The node may apply a suitable communication protocol for communicating with other nodes, in particular with communication units of the nodes. The node may be associated to one single load unit or to a plurality of load units. The node may include a control unit, a communication unit and other functional units, e.g. memory etc. The control unit may be provided as a CPU and is preferably adapted to determine the operation state of the load unit by
- using active and/or passive sensors, e.g. provided in the node or load unit actively requesting the operation state, e.g. from another device that controls the load unit,
- receiving information from at least one other device, such as a central controlling device or a neighboring node, regarding the operation state automatically and/or periodically,
- by detecting control signals that instruct the load unit to change the operation state.

The control unit may use one or more of these approaches or a combination thereof to determine the operation state of the associated at least one load unit. The device may select one of these approaches based on the given circumstances, such as available power, urgency and the like. Accordingly, transmission efficiency and transmission reliability is improved, since by adjusting the communication behaviour (communication parameters and/or communication mode) the negative effects of (electromagnetic) interferences (EMI) are mitigated.

In a preferred embodiment the wireless network is realized as a mesh-network or a star-network. The wireless network may employ any kind of wireless transmission techniques, such as RF (such as WiFi, Bluetooth, ZigBee or Z-Wave), light (infrared or visible), acoustic energy, and the like. However, the present invention is not limited to wireless networks and could also be applied to wired networks. Even a combination of wired and wireless is possible.

In a preferred embodiment the device could also be used for a node communicating in a point to point communication, i.e. two nodes communicating with each other wirelessly.

The network may include a central controlling device or backend, which is connected to some collector nodes. The collector nodes act as distributing nodes receiving and transmitting information from a plurality of nodes of the network. The collector node may for example be wire-connected to a central controlling device, and the remaining nodes may be connected to the collector node wirelessly. Accordingly, the present invention is open to a variety of applications.

In another preferred embodiment the adjustment of the communication mode of the node is performed before and/or during and/or after a change of the operation state. When the communication mode is adapted before the change of the operation state, preferably control signals or other information available in the control unit that instruct the load unit to change the operations state may be used to trigger the adjustment of the communication mode. Further, the instructed change of the operation state may be delayed until the adaption of the communication mode is completed. The communication mode may also be adapted before and after the change of the operation state. For example, when the operations state of the load unit is to be changed, a suitable communication mode is activated before the operation state of the load unit is changed. After completing the change of the operation state, another communication mode is activated. This is useful when the interference levels are different during the change of the operation state and thereafter. If the interference level is very high during changing the operation state of the load unit it is preferred to change the communication mode for that time. Here it might be preferred not to communicate at all or to communicate only a predetermined kind of information, like urgency messages but no normal status requests.

In still another preferred embodiment the change of the operation state includes at least one of switching on the load unit, switching off the load unit and gradually changing the operation state of the load unit. For instance, when the load unit comprises a light source, gradually changing the operation state corresponds to the process of dimming the light source.

Preferably the load unit comprises at least a switchable and/or variable load. However, the load unit may also comprise a plurality of different switchable and/or variable loads. For instance, if the load unit includes a luminaire, there could be provided different light sources, i.e. different loads, e.g. for day lighting, night lighting and/or emergency lighting. The light sources could also be switchable and/or dimmable (variable).

Preferably the load unit comprises a load and at least one switchable and/or variable load driver. Often loads, e.g. light sources, require load drivers to be operated. In these cases it may not be the load that is switchable and/or variable, but the load driver. Since load drivers are well known sources of strong electromagnetic interferences, it is advantageously to adjust the communication mode based on the operation state of the load driver.

In a preferred embodiment the control unit is adapted to determine the operation state by determining a power consumption of the load unit and/or a type of the load unit and/or the operation state of neighboring nodes in the wireless network and is further adapted to adjust the communication mode based on the determined power consumption and/or said determined operation states and/or said type. Neighboring nodes may be defined as the nodes within transmission range of the transmitting node, or may be pre-defined e.g. in the form of a table that is stored in a memory of the device. This allows a sophisticated adaption of the communication mode. In particular, changes of the circumstances are taken into consideration for selecting the proper communication mode. These changes may include a change/replacement of the load unit (type) itself and a change in power consumption of the load unit. The power consumption may for example be different for different temperatures.

In a preferred embodiment, the communication mode of the node is adjusted based on the operation state of at least one neighboring node. This is advantageous, since electromagnetic interference will mostly affect the reception performance of a node, in particular by decreasing the sensitivity of a receiver of said node. Accordingly, in a preferred embodiment the communication mode of a transmitting node is changed/adjusted based on a determined operation state of a neighboring node. Preferably, a transmit power of the transmitting node is increased in order to maintain/restore a communication link to a neighboring, e.g. a receiving, node.

In a preferred embodiment the control unit runs an algorithm based on a model, which takes into account the determined operation states of neighboring nodes. For instance, the neighbour with the worst performance degradation is taken into account, and the communication mode of the node is adjusted accordingly. Preferably, a transmit power of the node is increased in order to maintain/restore a communication link to the neighbour with the worst performance degradation.

Adjusting a communication mode of a node based on the operation state of at least one neighboring node is further advantageous, since neighboring nodes might have other loads and/or load drivers, other structural configurations (e.g. distance/seperation between a load and/or a load driver and/or a communication unit) and/or, e.g. in case of a lighting system, other dimming levels.

Information regarding operation states, loads and/or load drivers, interference susceptibility, number of observed neighbours, and/or information regarding the change in one of those can be included in regular beacons that the nodes send out to their neighbours, e.g. which are used to build up routing tables (see below). However, said information may also be included in separate beacons. These separate beacons might be sent by a node before the operation state of its associated load unit is changed.

Further, neighboring nodes may also cause interference at the location of the node under consideration. Therefore, it is advantageous to take the operation states of said neighboring nodes into account when selecting a communication node.

In another preferred embodiment the adjustment of the communication mode includes at least one of resetting and/or updating of at least one routing table stored in the node, increasing and/or decreasing a beaconing frequency for a predetermined time and increasing or decreasing a transmit power of the node for transmitting messages.

According to the present invention, in a routing-based multi-hop network data packets or messages are forwarded by means of routing tables stored in the nodes, wherein it is preferred to route messages differently depending on the operation state of the load unit. The routing table may be reset and/or updated on the event of changing the operation state, since the routing table is likely no longer up to date due to the change of the operation state. For updating the routing table the frequency of beaconing, which can be used to build up or update the routing table, can be increased to enable a fast building of the routing table. For observing the neighborhood a node may send periodically a beacon with connectivity information prompting the neighboring node to answer on the received beacon. The received answers are used to build up the routing tables. Alternatively, nodes can also regularly send out beacons containing connectivity information of the node, without the need to answer to this. Accordingly, routing table are built based on the received beacons. In both cases, the sent out beacons may contain information about a (hop or geographical) distance of the sending node with respect to a data collector, or their geographical position. If the distance of the node under consideration to the data collector is greater than a distance of a neighboring node, from which the beacon was received, to the data collector, a data packet may be forwarded to the data collector via said neighboring node.

During updating the routing table another routing method can be applied, e.g. flooding which does not require routing tables. Further, the routing table may be first reset to a default setting and then be updated. Alternatively, different routing tables for different operation states may be stored in a memory of the device and the routing table may be updated by activating a stored routing table. In this case it is not necessary to build up new routing tables. In the memory-based solution two routing tables could be used, one is used before and one after the change of the operation state. If two operation states of the load unit are normally used, one routing table is used for the first operations state and another routing table is used for the second operations state.

The adjustment of the communication mode may also include the change of certain parameters of the physical layer (PHY). One parameter may be the transmit power, that can be increased or decreased based on a change of the operation state. This can be done in a control loop (learning) manner until a certain performance is achieved, such a communication delay, number of observed neighbors, and/or success rate in communications. Preferably, the transmit power is increased when the load unit is in an "on" state, and is decreased when the load unit is in an "off" state. By increasing the transmit power of the node a transmission range of the node is increased and therefore, more neighboring nodes could be reached by the node, leading to an increased transmission efficiency and reliability. Additionally or alternatively, also the PHY data rate can be decreased, which typically increases the receiver sensitivity. Another possibility is to change the error correction coding rate or the length of CRC (cyclic redundancy check), to increase the reliability.

Further, the number of retransmissions of a message to be sent from one node to another can be changed. More retransmissions increase the probability of success, which can mitigate the effect of interference. It maybe further preferred to increase the counts of the counters during switching "on" the load unit to thereby increase the chance of receiving a packet before dropping a packet and requesting a new one. During switching "off" the counts of the counters may be reduced again.

It is noted, that the above-mentioned control loop (or learning) approach is not limited to the adjustment of the parameters of the physical layer, and in particular not to the adjustment of the transmit power, but can be used to adjust anyone of the parameters of the communication mode.

In a preferred embodiment a central controlling device centrally decides on the communication mode to be used by one or more nodes of the wireless network. Here, it is preferred that each node sends information regarding the operation state of its associated load unit to the central controlling device. Alternatively, the load units itself may be adapted to send operation state information to the central controlling device. The central controlling device then decides on the communication mode based on the received information and instructs the nodes to change their communication mode. This procedure can be performed periodically in certain time intervals, but may as well be performed upon request of one of the nodes or a user. Additionally or alternatively the nodes may store the communication mode associated with a particular operation state as provided by the central controller, and apply the respective communication mode automatically upon a subsequent change of the operation state.

In a preferred embodiment, after the change of the operation state of the load unit, a different communication mode of the node is activated for a predetermined time. The different communication mode may be applied during updating a routing table, wherein the predetermined time preferably corresponds to the time that is required to update the routing table. The communication mode that is activated for a predetermined time may include high-level transmission parameters, such as maximum transmit power. This ensures a sufficient transmission efficiency and transmission reliability although e.g. the routing table has not been updated yet. Thus, it is possible to communicate with nodes, although noise levels and/or interferences are high due to the operations state of the load unit.

Preferably the device is operatively coupled to or integrated in the node. The device may be attached in a removable and/or reusable manner to a node, or the device may be integrated into the node. Referring to the latter, the device may be part of or integrated in a CPU of the node. Further, it is possible to upgrade existing nodes with the device.

In a preferred embodiment the device is used in a lighting control system. The lighting control system may be an outdoor lighting control system for telemanagement (remote control) of luminaire nodes. A luminaire representing the load unit may preferably comprise a light source and, if required, a light source driver. Thus, the luminaire can be easily switched on/off and/or the dimming patterns can be controlled based on conditions, such as daytime, season, weather, ambience brightness, occurrence of traffic accidents, presence of road works etc. These conditions may be determined by sensors provided with the luminaire nodes and then be reported to a neighboring node, a data collector node and/or the central controlling device, respectively. The device of the present invention may also be used in indoor lighting control systems. However, the present invention is not limited to lighting systems and may as well be applied to air-conditioning systems and other kinds of networks using communication suffering from interference.

In another aspect of the present invention a method for controlling a node of a wireless network is provided, wherein the node is associated to at least one load unit. The method comprises determining an operation state of the load unit, and adjusting a communication mode of the node for communication with other nodes of the wireless network based on the determined operation state of the load unit. The method is suitable for being applied with the device described above.

In still another aspect of the present invention a system for controlling a node of a wireless network is provided, the system comprising a plurality of nodes, wherein at least one of them is associated to a load unit and at least one of them being coupled to a device for controlling a node of a wireless network as described above, wherein messages are transmitted between the nodes via the wireless network.

In another aspect of the present invention a system for controlling a node of a wireless network is provided, comprising a plurality of nodes, at least one of them being associated to a load unit, and a central controlling device communicating with at least one of the nodes via the wireless network, wherein the central controlling device is adapted to adjust a communication mode of at least one node based on an operation state of the load unit associated to the node.

DETAILED DESCRIPTION

Preferred applications of the present invention are outdoor lighting systems (e.g. for streets, parking and public areas), indoor lighting systems for general area lighting (e.g. for malls, arenas, parking, stations, tunnels etc.), heating, ventilation, and air conditioning (HVAC) or sensor and actuator networks. In the following, the present invention will be explained further using the example of an outdoor lighting system for street illumination. In the field of lighting control, the telemanagement of outdoor luminaires via radio-frequency network technologies is receiving increasing interest, in particular solutions with applicability for large-scale installations (say above 200 luminaires).

Figure 2:
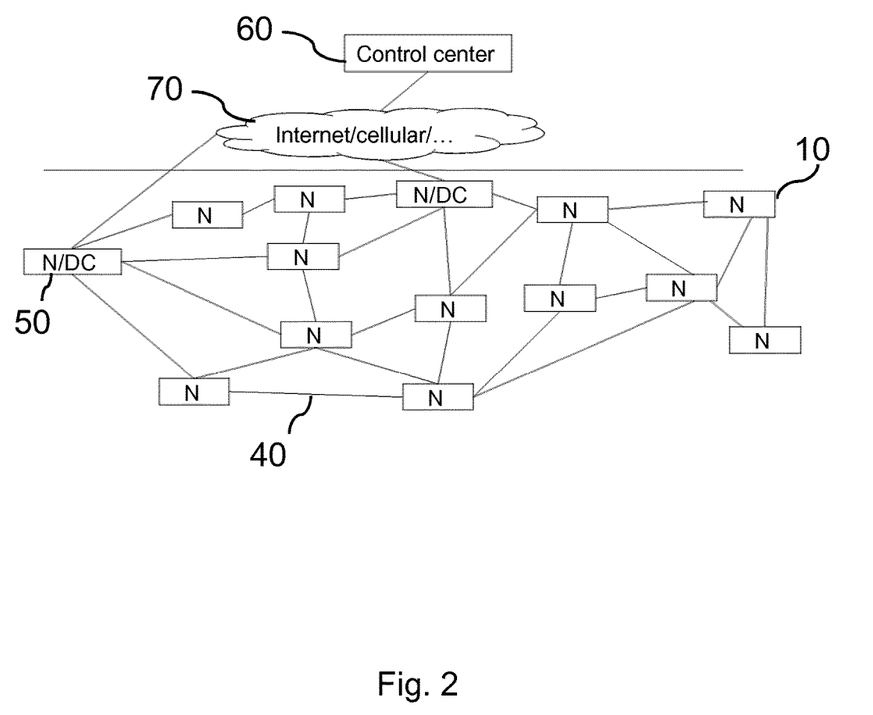
FIG. 2 shows an example of a wireless mesh network.

In FIG. 2, a typical network with mesh topology is shown. A plurality of nodes 10 (N) is connected to each other by wireless communication paths 40. Some of the nodes 10 function as data collector nodes 50 (N/DC), which receive data packets from the surrounding nodes 10 via single-hop or multi-hop transmissions and transmit them to a control center 60 and vice versa. Thus, the data collector nodes 50 may operate in the manner of gateways between the nodes 10 and the central controlling device or control center 60. The wireless communication path 40 between the nodes 10 and data collector nodes 50 may be constituted by radio frequency transmissions, while the connection 70 between the data collector nodes 50 and the control center 60 may make use of the Internet, mobile communication networks, radio systems, Ethernet, DSL, cable or other wired or wireless data transmission systems.

Compared to other so-called ad-hoc mesh networks, the telemanagement system for an outdoor lighting control network is stationary, i.e. the nodes 10 do not move. Also, all nodes 10 may be connected to mains power. Consequently, network changes will be mainly due to a changing environment, e.g. due to traffic. Since the nodes 10 are stationary, the physical positions of the nodes 10, for instance GPS coordinates, may be known in the system, enabling geographic or position-based routing.

For data packet transmission from the luminaire nodes 10 to the data collector nodes 50, sink distance vector routing is preferred, wherein every node 10 selects as intermediate node 10 the neighboring node 10 that is closer to one of the data collector nodes 50 (so-called sinks). Preferably, a routing solution is used, since the routes to the data collector nodes 50 are regularly used. Preferably, a routing table is stored in every node 10, indicating which neighboring node 10 is closer to one of the data collector nodes 50. Thus, data packets can be sent to the closest data collector node 50 in a very efficient and fast way. Advantageously, each node 10 keeps information about multiple downlink neighboring nodes 10 as alternative routes in order to increase reliability.

Figure 3:
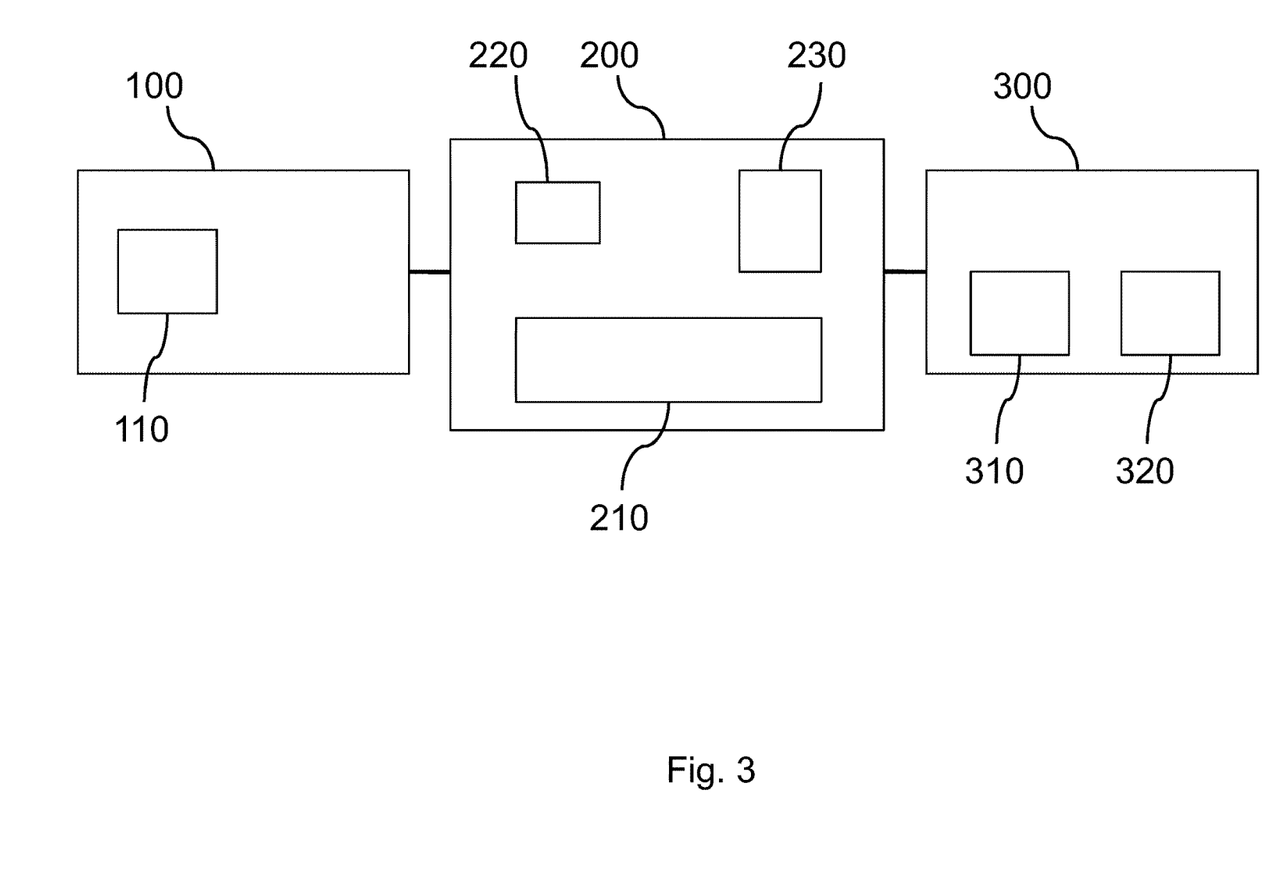
FIG. 3 shows a schematic drawing of a first embodiment of the present invention.

FIG. 3 shows a first embodiment of the present invention. A device 100 and a load unit 300 are each operatively coupled to a node 200. The node 200 as shown in FIG. 3 may be the node 10 or data collector node 50 of a wireless multi-hop mesh network as shown in FIG. 2.

The device 100 comprises a control unit 110 that may be realized as a central processing unit (CPU). Further, the device 100 may include a power source, such as a solar power system or a battery. The battery may be (re)chargeable by the solar power system. For example, the battery may only be used as a power source when the solar power system does not provide sufficient power, e.g. during night. However, the device 100 may also be supplied with power via an external power source/power line or by the node 200.

The node 200 comprises a communication unit 210 for transmitting or receiving data packets via wireless communication paths 40, e.g. via radio frequency transmission. The node 200 further comprises a memory 220 for storing e.g. routing tables. Additionally or alternatively, a further or the same memory could be provided in the communication unit 210. The node 200 further includes a control unit 230 for controlling the load unit 300 and/or the communication unit 210 and/or a power system. The power system may be the same as or similar to the power system described above.

The load unit 300 is operatively coupled to and/or controlled by the node 200 and may comprise a load 320 and a load driver 310. In this example the load unit 300 may include a light source 320 and light source driver 310. The light source driver 310 is controlled by the control unit 230. Preferably, the light source driver 310 is switchable and dimmable. The control unit 230 of the node determines the switching/dimming state of the light source driver 310 and reports these states to the control unit 110 of the device 100. Alternatively, the control unit 110 of the device 100 is adapted to determine the operation state by means of sensors. Based on the determined states the control unit 110 adjusts/changes the communication mode, i.e. parameters and or a mode for communication, of the communication unit 210. Alternatively, the control unit 110 of the device may instruct the control unit 230 of the node 200 to adjust the communication mode. For instance, if it is determined that the light source driver 310 (and the light source 320) has been switched from "off" to "on", it is assumed that a noise level has increased and that that electromagnetic interference will occur. In particular, as shown in FIG. 1, switching on a light results in a reduced number of neighbors that can be observed, i.e. to a decrease in transmission range. Accordingly, the communication mode is adjusted e.g. such that a transmit power of the node 200 is increased, thereby increasing the transmission range of the node 200 again. As a result, transmission reliability and transmission efficiency is increased.

Figure 4:
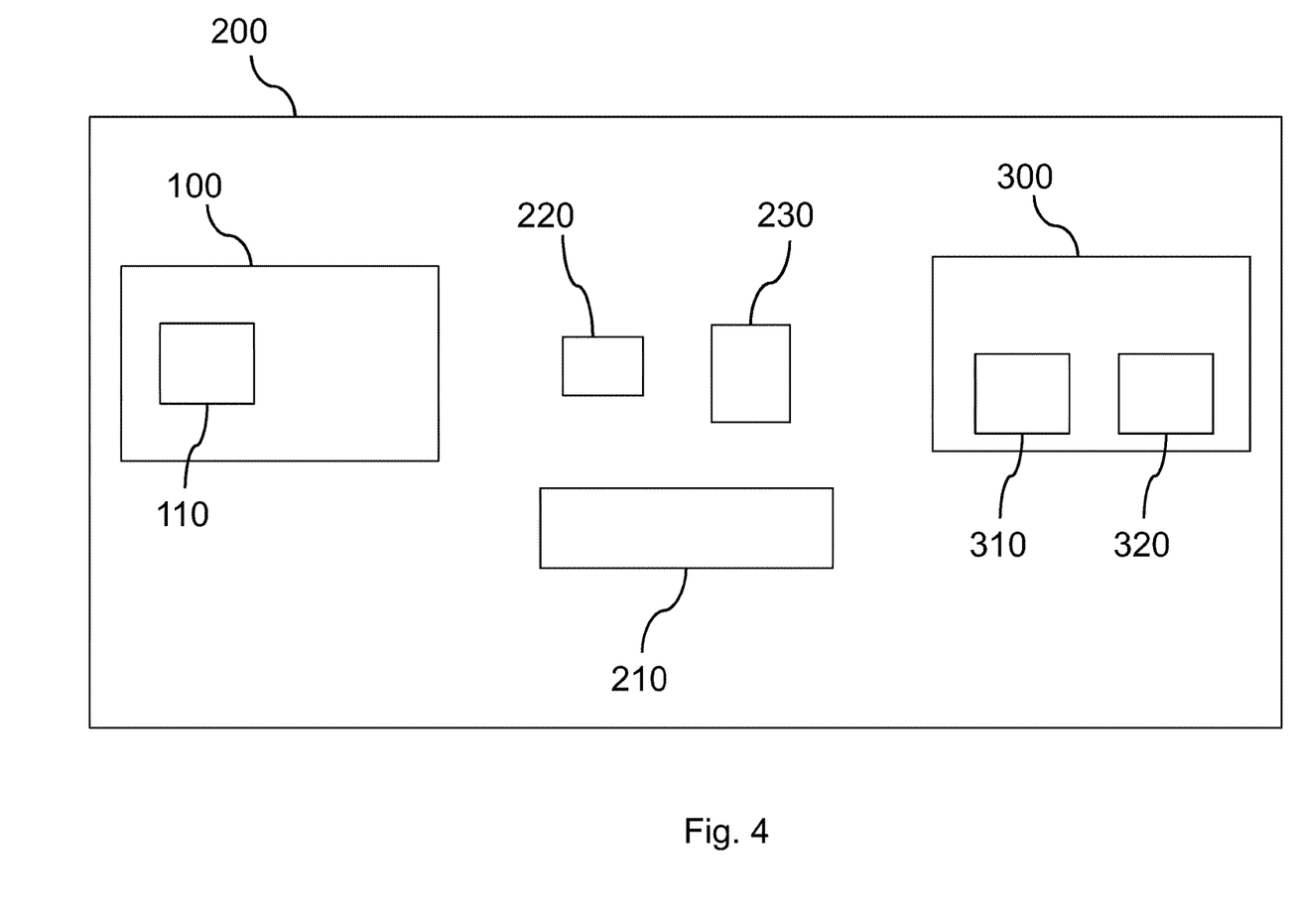
FIG. 4 shows a schematic drawing of a second embodiment of the present invention.

FIG. 4 shows an alternative embodiment of the present invention. This embodiment is similar to the embodiment shown in FIG. 3, with the difference being that the device 100 and the load unit 300 are integrated into the node 200. However, it is also possible to only integrate either the load unit 200 or the device 100. The functions of the shown elements are the same as described with respect to the first embodiment. Therefore, a description thereof is omitted. Further, in the second embodiment, only one single control unit could be provided for controlling the device 100, the node 200 and the load unit 300. Furthermore, said single control unit could also include and/or perform the functions associated with the communication unit 210. In this case, the control units and the communication unit could be implemented as one single CPU.

Figure 5:
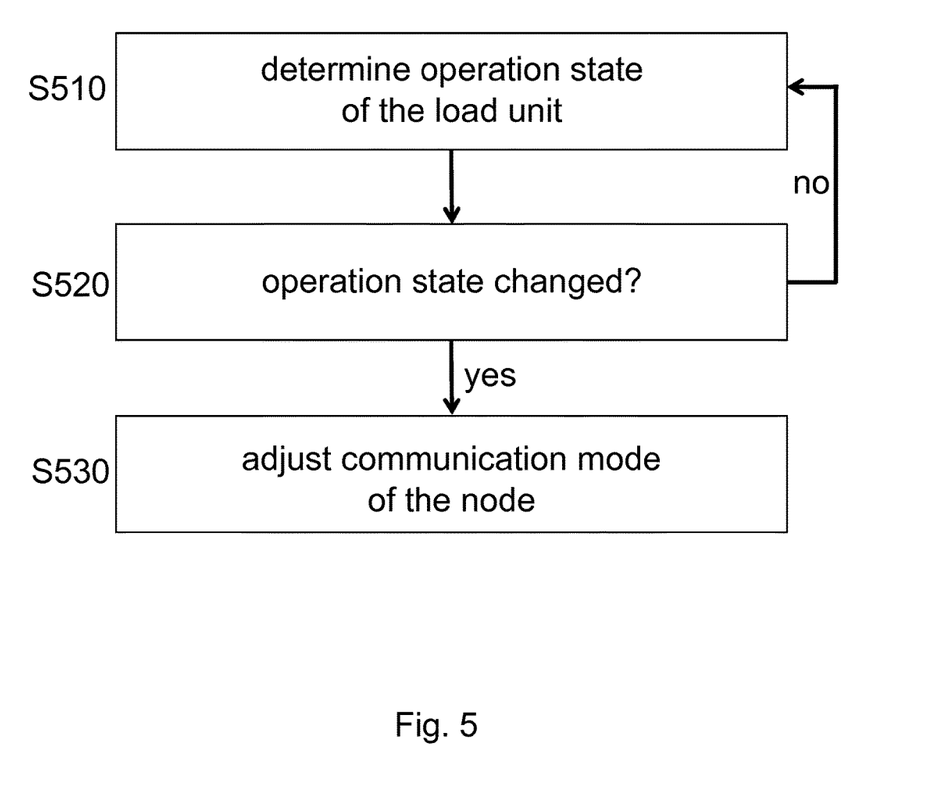
FIG. 5 shows a flow diagram of a method according to a first embodiment of the present invention.

FIG. 5 shows a flow diagram of a method according to a first embodiment of the present invention. In the method, first the operation state of the load unit is determined (step 510). For example, the control unit 110 of the device 100 monitors a power consumption of the light source driver via sensors. When it is determined that the operation state has not been changed, the communication mode remains unchanged. If it is determined that the power consumption and/or a voltage level of the load/load driver and/or a switching state of the load/load driver has changed, it is assumed that the operation state has been changed (step 520). In order to determine how the operation state has been changed, different thresholds may be pre-defined to distinguish between "on", "off" and different dimming levels. For example, thresholds could denote 0%, 20%, 40%, 60%, 80% and 100% of a maximum power consumption. In this example, 0% corresponds to "off", 100% to "on" and 20%, 40%, 60% and 80% correspond to different dimming levels. Accordingly, different communication modes are selected and activated (step 530) by the controller for 0%, 1-19%, 20-39%, 40-59%, 60-79%, 80-99% and 100%. Accordingly, by selecting a suitable communication mode transmission reliability and transmission efficiency is increased despite an increased noise level at the position of the receiving node.

Figure 6:
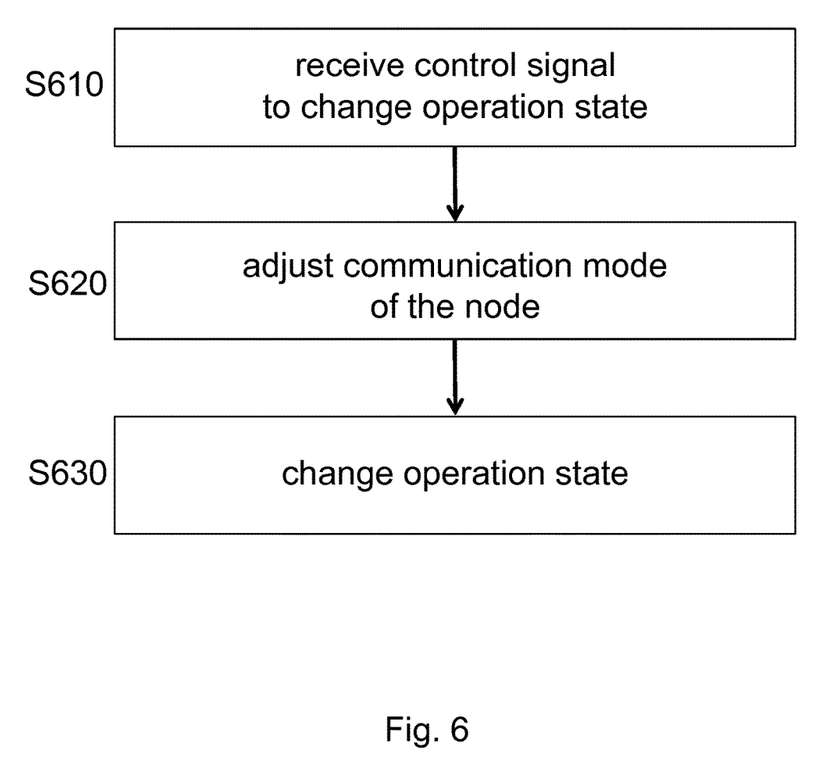
FIG. 6 shows a flow diagram of a method according to a second embodiment of the present invention.

FIG. 6 shows a flow diagram of a method according to a second embodiment of the present invention. In this embodiment the control unit detects control signals that instruct a change of the operation state (step 610). These control signals may be provided externally, for example by a central controlling device, or internally. In the latter, e.g. nightfall is detected by respective sensors provided in the luminaire, and a control signal is generated that instructs the luminaire to turn on the light. The control signal is also detected/acknowledged by the control unit 110 of the device 100 and the communication mode may be adjusted (step 620) as described with respect to the embodiment shown in FIG. 5. Additionally, the change of the operation state could be delayed the adjustment of the communications state is completed (step 630). For example, the change of the operation state is delayed until a routing table is updated. Alternatively, the control unit 110 may receive a separate signal indicating that it is intended to change the operation state. This signal may again be provided externally or internally, in the latter e.g. by the control unit 230 of the node 200.

Figure 7:
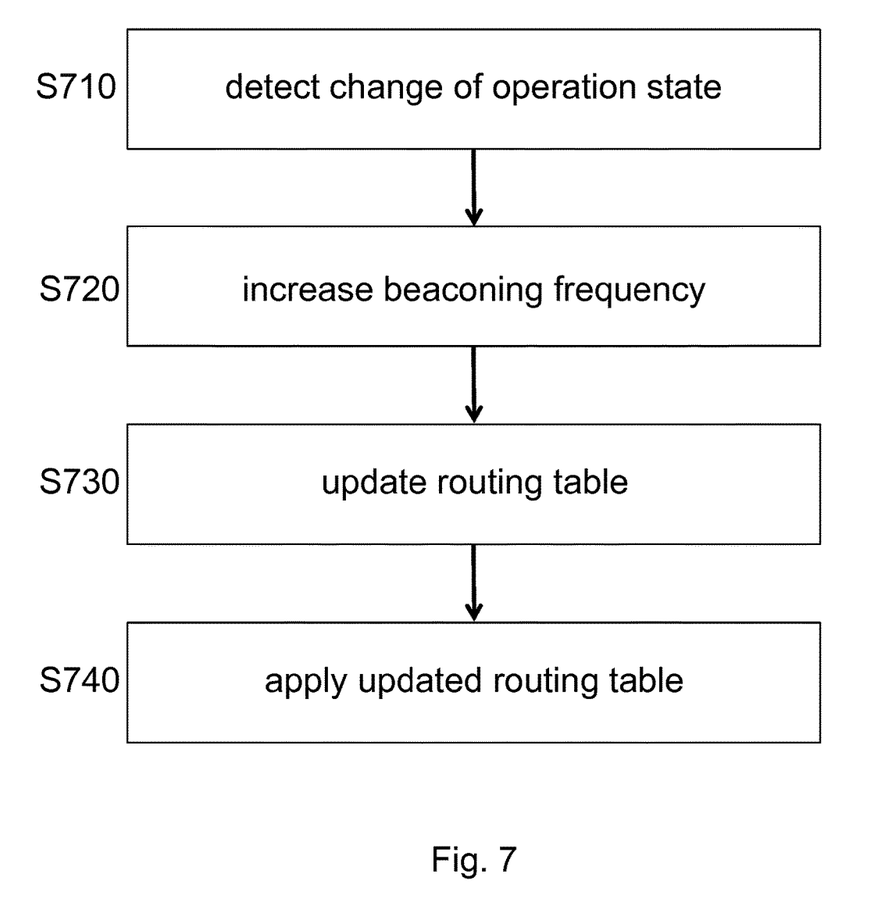
FIG. 7 shows a flow diagram of a method according to a third embodiment of the present invention.

FIG. 7 shows a flow diagram of a method according to a third embodiment of the present invention. In this embodiment e.g. the control unit 110 of the node 200 detects a change of the operations state of the load unit 300 (step S710). The control unit 110 of the node 200 instructs the node 200, i.e. the control unit 230 and/or the communication unit 210 of the node 200, to increase a beaconing frequency (step S720) used for faster updating a routing table (step S730). Due to the increased beaconing frequency, a time required for updating the routing table is significantly reduced. After completion of updating the routing table, said routing table is selected/activated (step S740) and used for communicating with the neighboring nodes in the network. Preferably, after the routing table has been updated the beaconing frequency is reduced again in order to save energy and to avoid a waste of network resources.

Figure 8:
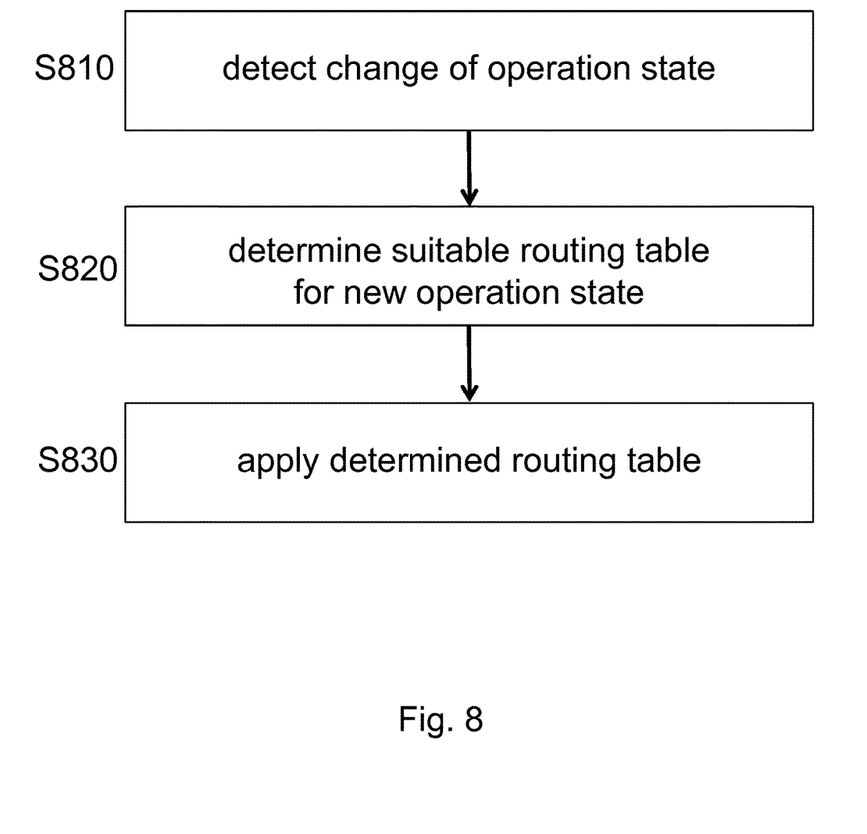
FIG. 8 shows a flow diagram of a method according to a fourth embodiment of the present invention.

FIG. 8 shows a flow diagram of a method according to a fourth embodiment of the present invention. In this embodiment e.g. the control unit 110 of the node 200 detects a change of the operations state of the load unit 300 (step S810). The control unit 110 of the node 200 determines a routing table that is suitable for the new operation state (step S820). For example, different routing tables for different operation states may be pre-stored in a memory of the node 200 or the device 100. The control unit 110 instructs the node 200, i.e. the control unit 230 and/or the communication unit 210 of the node 200, to switch to the determined routing table (step S830). However, steps S820 and S830 could also be performed by the controller and/or the communication mode of the node 200. In particular, the control unit 110 of the device may provide the determined operation state of the load unit 200 to the control unit 230 and/or the communication unit 210 of the node.

Figure 9:
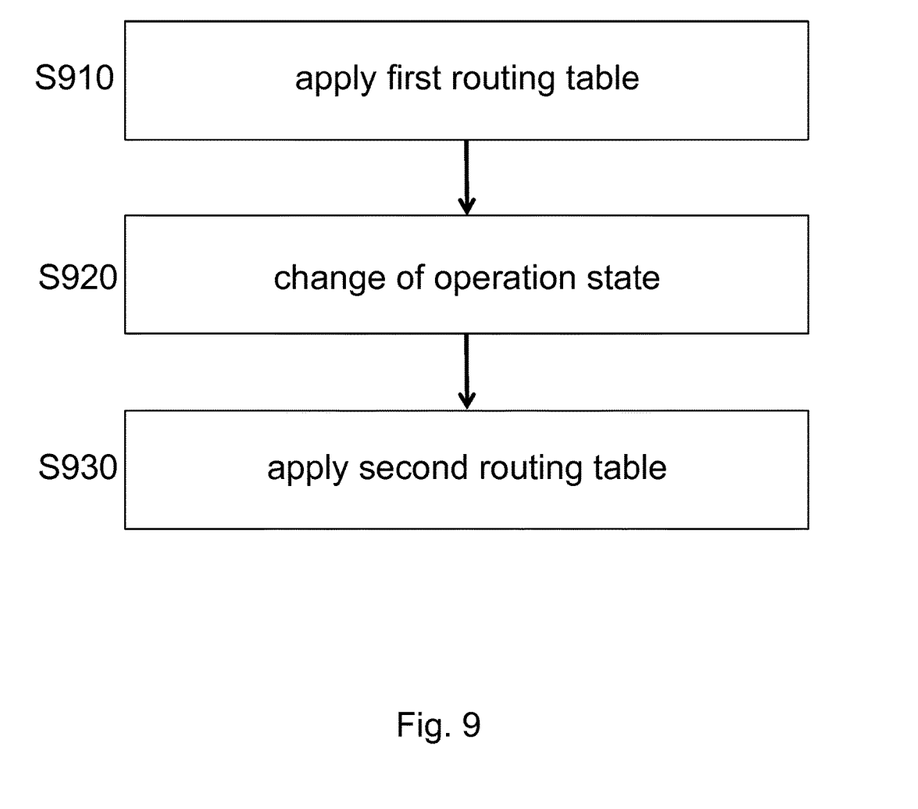
FIG. 9 shows a flow diagram of a method according to a fifth embodiment of the present invention.

FIG. 9 shows a flow diagram of a method according to a fifth embodiment of the present invention. In this embodiment two different routing tables are used depending on the operation state of the load unit 300. Initially a first routing table is applied for communication (step S910). When the control unit 110 of the device 110 detects a change in the operation state (step S920), the second routing table is selected and activated (step 930). For instance, in case of an outdoor lighting system, the lights may be switched on at 8 pm. The first routing table may be applied before 8 pm and the second routing table may be applied after 8 pm. The control unit 110 may detect the change of the operation state by either determining the operation state as described previously, or by a clock.

In the central approach, the commands for changing the operation mode of the node are transmitted by the central controlling device to the nodes. Also here, it is possible to control the communication mode based on received operation state information or based on time.

The invention provides the advantage to adapt the communication mode of the node based current operation state. Thus, an intelligent solution is provided reflecting the operation state of the load units in a network, to thereby consider the interference caused by switching or changing loads influencing the communication behavior of the node.

The invention claimed is:

1. A luminaire acting as a node of a wireless network comprising a plurality of nodes, the luminaire comprising:
   at least one light source configured to function according to at least two operation states;
   a communication unit configured to transmit or receive information from neighboring nodes; and
   a control unit configured to adjust a communication mode of the communication unit based on a change to at least one of the at least two operation states of the at least one light source that causes interference, wherein the control unit is further configured to receive information about the change of the at least one of the at least two operation states from the communication unit of the wireless network;
   wherein the adjustment of the communication mode of the communication unit comprises increasing or decreasing a transmit power of the communication unit for transmitting messages to an adjusted transmit power amount, wherein said adjusted transmit power is greater than zero.

2. The luminaire of claim 1, wherein the wireless network is a mesh-network, a star-network or a point to point communication between two nodes communicating with each other wirelessly.

3. The luminaire of claim 1, wherein the change of the at least one of the at least two operation states of the light source includes at least one of switching on the light source, switching off the light source and gradually changing the operation state of the light source.

4. The luminaire according to claim 3, wherein the light source comprises at least a switchable and/or variable load.

5. The luminaire of claim 4, wherein the light source comprises further at least a switchable and/or variable load driver connected to the light source.

6. The luminaire according to claim 5, wherein the control unit is configured to determine the operations state of the light source by determining a power consumption of the light source and/or a type of the light source and/or the operation state of at least one neighboring node in the wireless network, and is further configured to adjust the communication mode based on the determined power consumption of the light source and/or said determined operation state of the at least one neighboring node and/or said type of the light source.

7. The luminaire according to claim 6, wherein the adjustment of the communication mode of the communication unit further includes at least one of resetting and/or updating of at least one routing table stored in a memory of the luminaire, and/or increasing and/or decreasing a beaconing frequency of the communication unit for a predetermined time.

8. The luminaire of claim 7, wherein different routing tables are activated within the communication unit depending on the operation state of the light source.

9. The luminaire according to claim 8, wherein after the change of the at least one of the at least two operation states of the light source a different communication mode of the communication unit is activated for a predetermined time.

10. A method for controlling a communication unit of a luminaire acting as a node of a wireless network comprising a plurality of nodes, the luminaire including at least a light source, comprising the steps of:
    determining, by a control unit of the luminaire, a change of an operation state of the light source that causes interference;
    sending information about the determined change of the operation state to a control device; and
    adjusting, using the control device, a communication mode of the communication unit for communication with other nodes of the wireless network, based on the determined operation state of the light source, wherein the adjustment of the communication mode of the communication unit comprises increasing or decreasing a transmit power of the communication unit for transmitting messages to an adjusted transmit power amount, wherein said adjusted transmit power amount is greater than zero.

11. A system for controlling a node of a wireless network, the system comprising:
a plurality of nodes, at least one of them being a luminaire according to claim 2, wherein messages are transmitted between the nodes via the wireless network.

12. A system for controlling a node of a wireless network, the system comprising:
a plurality of nodes, at least one of the plurality of nodes being a luminaire including at least a light source and a communication unit, wherein the at least one of the plurality of nodes is configured to detect a change of an operation state of the light source that causes interference; and
a central controlling device communicating with at least one of the nodes via the wireless network, wherein the central controlling device is configured to receive information about the change of the operation state from the node associated with the light source, and further configured to adjust a communication mode of the communication unit based on the received information, wherein the adjustment of the communication mode of the communication unit comprises increasing or decreasing a transmit power of the communication unit for transmitting messages to an adjusted transmit power amount, wherein said adjusted transmit power amount is greater than zero.

* * * * *